US008249865B2

(12) United States Patent
Birmingham (10) Patent No.: US 8,249,865 B2
(45) Date of Patent: Aug. 21, 2012

(54) ADAPTIVE DATA TRANSMISSION FOR A DIGITAL IN-BAND MODEM OPERATING OVER A VOICE CHANNEL

(75) Inventor: Kiley Birmingham, Seattle, WA (US)

(73) Assignee: Airbiquity Inc., Seattle, WA (US)

( * ) Notice: Subject to any disclaimer, the term of this patent is extended or adjusted under 35 U.S.C. 154(b) by 0 days.

(21) Appl. No.: 12/904,093

(22) Filed: Oct. 13, 2010

(65) Prior Publication Data

US 2011/0125488 A1 May 26, 2011

Related U.S. Application Data

(60) Provisional application No. 61/263,672, filed on Nov. 23, 2009.

(51) Int. Cl.
 *G10L 19/14* (2006.01)
(52) U.S. Cl. .................................................. 704/221
(58) Field of Classification Search ........... 704/221–223
 See application file for complete search history.

(56) References Cited

U.S. PATENT DOCUMENTS

| | | | |
|---|---|---|---|
| 3,742,197 A | 6/1973 | Pommerening |
| 3,742,463 A | 6/1973 | Haselwood |
| 3,971,888 A | 7/1976 | Ching |
| 3,984,814 A | 10/1976 | Bailey, Jr. |
| 3,985,965 A | 10/1976 | Field |
| 4,158,748 A | 6/1979 | En |
| 4,218,654 A | 8/1980 | Ogawa |
| 4,310,722 A | 1/1982 | Schaible |
| 4,355,310 A | 10/1982 | Belaigues |
| 4,368,987 A | 1/1983 | Waters |
| 4,494,114 A | 1/1985 | Kaish |
| 4,494,211 A | 1/1985 | Schwartz |
| 4,539,557 A | 9/1985 | Redshaw |

(Continued)

FOREIGN PATENT DOCUMENTS

CA 2242495 1/2000
(Continued)

OTHER PUBLICATIONS

Digital Cellular Telecommunications System (Phase 2+); GSM 06.31 version 8.0.1 Release 1999. ETSI EN 300 964 V8.01 (Nov. 2000), pp. 1-13. European Standard (Telecommunications serier). (http://www.etsi.org).

(Continued)

*Primary Examiner* — Abul Azad
(74) *Attorney, Agent, or Firm* — Stolowitz Ford Cowger LLC (57) ABSTRACT

In one example, a mobile device encodes a digital bitstream using a particular set of modulation parameters to generate an audio signal that has different audio tones selected to pass through a vocoder of the mobile device. The particular set of modulation parameters is optimized for a subset of a plurality of vocoding modes without a priori knowledge of which one of the vocoding modes is currently operated by the vocoder. The mobile device conducts transmissions over the wireless telecommunications network through the vocoder using the particular set of modulation parameters, and monitors these transmissions for errors. If the errors reach a threshold, then the vocoder may be using one of the vocoding modes that are not included in the subset for which the particular set of modulation parameters is optimized, and accordingly, the modulation device switches from the particular set of modulation parameters to a different set of modulation parameters.

20 Claims, 7 Drawing Sheets

U.S. PATENT DOCUMENTS

| | | | |
|---|---|---|---|
| 4,577,343 A | 3/1986 | Oura | |
| 4,595,950 A | 6/1986 | Lofberg | |
| 4,598,272 A | 7/1986 | Cox | |
| 4,599,583 A | 7/1986 | Shimozono | |
| 4,607,257 A | 8/1986 | Noguchi | |
| 4,630,301 A | 12/1986 | Hohl | |
| 4,641,323 A | 2/1987 | Tsang | |
| 4,651,157 A | 3/1987 | Gray | |
| 4,656,463 A | 4/1987 | Anders | |
| 4,675,656 A | 6/1987 | Narcisse | |
| 4,685,131 A | 8/1987 | Horne | |
| 4,750,197 A | 6/1988 | Denekamp | |
| 4,754,255 A | 6/1988 | Sanders | |
| 4,766,589 A | 8/1988 | Fisher | |
| 4,776,003 A | 10/1988 | Harris | |
| 4,817,089 A * | 3/1989 | Paneth et al. | 370/280 |
| 4,831,647 A | 5/1989 | D'Avello | |
| 4,860,336 A | 8/1989 | D'Avello | |
| 4,914,651 A | 4/1990 | Lusignan | |
| 4,918,425 A | 4/1990 | Greenberg | |
| 4,918,717 A | 4/1990 | Bissonnette | |
| 4,926,444 A | 5/1990 | Hamilton | |
| 4,941,155 A | 7/1990 | Chuang | |
| 4,965,821 A | 10/1990 | Bishop | |
| 4,977,609 A | 12/1990 | McClure | |
| 4,984,238 A | 1/1991 | Watanabe | |
| 5,014,344 A | 5/1991 | Goldberg | |
| 5,025,455 A | 6/1991 | Nguyen | |
| 5,036,537 A | 7/1991 | Jeffers | |
| 5,040,214 A | 8/1991 | Grossberg | |
| 5,043,736 A | 8/1991 | Darnell | |
| 5,081,667 A | 1/1992 | Drori | |
| 5,095,307 A | 3/1992 | Shimura | |
| 5,119,403 A | 6/1992 | Krishnan | |
| 5,119,504 A | 6/1992 | Durboraw, III | |
| 5,134,644 A | 7/1992 | Garton | |
| 5,155,689 A | 10/1992 | Wortham | |
| 5,191,611 A | 3/1993 | Lang | |
| 5,201,071 A | 4/1993 | Webb | |
| 5,203,012 A | 4/1993 | Patsiokas | |
| 5,208,446 A | 5/1993 | Martinez | |
| 5,212,831 A | 5/1993 | Chuang | |
| 5,214,556 A | 5/1993 | Kibel | |
| 5,218,618 A | 6/1993 | Sagey | |
| 5,223,844 A | 6/1993 | Mansell | |
| 5,227,776 A | 7/1993 | Starefoss | |
| 5,235,633 A | 8/1993 | Dennison | |
| 5,245,634 A | 9/1993 | Averbuch | |
| 5,245,647 A | 9/1993 | Grouffal | |
| 5,272,747 A | 12/1993 | Meads | |
| 5,282,204 A | 1/1994 | Shpancer | |
| 5,289,372 A | 2/1994 | Guthrie | |
| 5,301,353 A | 4/1994 | Borras | |
| 5,301,359 A | 4/1994 | Van Den Heuvel | |
| 5,305,384 A | 4/1994 | Ashby, III | |
| 5,317,309 A | 5/1994 | Vercellotti | |
| 5,331,635 A | 7/1994 | Ota | |
| 5,333,175 A | 7/1994 | Ariyavisitakul | |
| 5,334,974 A | 8/1994 | Simms | |
| 5,347,272 A | 9/1994 | Ota | |
| 5,363,375 A | 11/1994 | Chuang | |
| 5,363,376 A | 11/1994 | Chuang | |
| 5,365,450 A | 11/1994 | Schuchman | |
| 5,365,577 A | 11/1994 | Davis | |
| 5,379,224 A | 1/1995 | Brown | |
| 5,381,129 A | 1/1995 | Boardman | |
| 5,388,147 A | 2/1995 | Grimes | |
| 5,388,247 A | 2/1995 | Goodwin | |
| 5,389,934 A | 2/1995 | Kass | |
| 5,390,216 A | 2/1995 | Bilitza | |
| 5,396,539 A | 3/1995 | Slekys | |
| 5,396,653 A | 3/1995 | Kivari | |
| 5,408,684 A | 4/1995 | Yunoki | |
| 5,410,541 A | 4/1995 | Hotto | |
| 5,410,739 A | 4/1995 | Hart | |
| 5,414,432 A | 5/1995 | Penny, Jr. | |
| 5,418,537 A | 5/1995 | Bird | |
| 5,420,592 A | 5/1995 | Johnson | |
| 5,422,816 A | 6/1995 | Sprague | |
| 5,428,636 A | 6/1995 | Meier | |
| 5,438,337 A | 8/1995 | Aguado | |
| 5,440,491 A | 8/1995 | Kawano | |
| 5,448,622 A | 9/1995 | Huttunen | |
| 5,450,130 A | 9/1995 | Foley | |
| 5,459,469 A | 10/1995 | Schuchman | |
| 5,461,390 A | 10/1995 | Hoshen | |
| 5,475,864 A | 12/1995 | Hamabe | |
| 5,475,868 A | 12/1995 | Duque-Anton | |
| 5,479,480 A | 12/1995 | Scott | |
| 5,479,482 A | 12/1995 | Grimes | |
| 5,483,549 A | 1/1996 | Weinberg | |
| 5,491,690 A | 2/1996 | Alfonsi | |
| 5,497,149 A | 3/1996 | Fast | |
| 5,504,491 A | 4/1996 | Chapman | |
| 5,506,888 A | 4/1996 | Hayes | |
| 5,509,035 A | 4/1996 | Teidemann, Jr. | |
| 5,510,797 A | 4/1996 | Abraham | |
| 5,513,111 A | 4/1996 | Wortham | |
| 5,515,043 A | 5/1996 | Berard | |
| 5,519,403 A | 5/1996 | Bickley | |
| 5,519,621 A | 5/1996 | Wortham | |
| 5,528,232 A | 6/1996 | Verma | |
| 5,530,701 A | 6/1996 | Stillman | |
| 5,537,458 A | 7/1996 | Suomi | |
| 5,539,810 A | 7/1996 | Kennedy, III | |
| 5,543,789 A | 8/1996 | Behr | |
| 5,544,222 A | 8/1996 | Robinson | |
| 5,544,225 A | 8/1996 | Kennedy, III | |
| 5,546,445 A | 8/1996 | Dennison | |
| 5,550,551 A | 8/1996 | Alesio | |
| 5,551,066 A | 8/1996 | Stillman | |
| 5,555,286 A | 9/1996 | Tendler | |
| 5,555,520 A | 9/1996 | Sudo | |
| 5,557,254 A | 9/1996 | Johnson | |
| 5,565,858 A | 10/1996 | Guthrie | |
| 5,566,173 A | 10/1996 | Steinbrecher | |
| 5,572,204 A | 11/1996 | Timm | |
| 5,576,716 A | 11/1996 | Sadler | |
| 5,587,715 A | 12/1996 | Lewis | |
| 5,590,396 A | 12/1996 | Henry | |
| 5,594,425 A | 1/1997 | Ladner | |
| RE35,498 E | 4/1997 | Barnard | |
| 5,619,684 A | 4/1997 | Goodwin | |
| 5,621,388 A | 4/1997 | Sherburne | |
| 5,625,668 A | 4/1997 | Loomis | |
| 5,627,517 A | 5/1997 | Theimer | |
| 5,630,206 A | 5/1997 | Urban | |
| 5,635,450 A | 6/1997 | Mayer | |
| 5,637,355 A | 6/1997 | Stanforth | |
| 5,640,444 A | 6/1997 | O'Sullivan | |
| 5,650,770 A | 7/1997 | Schlager | |
| 5,663,734 A | 9/1997 | Krasner | |
| 5,666,357 A | 9/1997 | Jangi | |
| 5,668,803 A | 9/1997 | Tymes | |
| 5,673,305 A | 9/1997 | Ross | |
| 5,680,439 A | 10/1997 | Aguilera | |
| 5,686,910 A | 11/1997 | Timm | |
| 5,687,215 A | 11/1997 | Timm | |
| 5,687,216 A | 11/1997 | Svensson | |
| 5,691,980 A | 11/1997 | Welles, II | |
| 5,703,598 A | 12/1997 | Emmons | |
| 5,711,013 A | 1/1998 | Collett | |
| 5,712,619 A | 1/1998 | Simkin | |
| 5,712,899 A | 1/1998 | Pace, II | |
| 5,724,243 A | 3/1998 | Westerlage | |
| 5,726,893 A | 3/1998 | Schuchman | |
| 5,726,984 A | 3/1998 | Kubler | |
| 5,731,757 A | 3/1998 | Layson, Jr. | |
| 5,732,326 A | 3/1998 | Maruyama | |
| 5,734,981 A | 3/1998 | Kennedy, III | |
| 5,742,233 A | 4/1998 | Hoffman | |
| 5,748,083 A | 5/1998 | Rietkerk | |
| 5,748,084 A | 5/1998 | Isikoff | |
| 5,751,246 A | 5/1998 | Hertel | |
| 5,752,186 A | 5/1998 | Malackowski | |
| 5,752,193 A | 5/1998 | Scholefield | |
| 5,752,195 A | 5/1998 | Tsuji | |

| | | | | | | |
|---|---|---|---|---|---|---|
| 5,754,554 | A | 5/1998 | Nakahara | 6,021,163 | A | 2/2000 | Hoshi |
| D395,250 | S | 6/1998 | Kabler | 6,024,142 | A | 2/2000 | Bates |
| 5,761,204 | A | 6/1998 | Grob | 6,031,489 | A | 2/2000 | Wyrwas |
| 5,761,292 | A | 6/1998 | Wagner | 6,032,037 | A | 2/2000 | Jeffers |
| 5,771,001 | A | 6/1998 | Cobb | 6,038,310 | A | 3/2000 | Hollywood |
| 5,771,455 | A | 6/1998 | Kennedy, III | 6,038,595 | A | 3/2000 | Ortony |
| 5,774,876 | A | 6/1998 | Woolley | 6,041,124 | A | 3/2000 | Sugita |
| 5,778,024 | A * | 7/1998 | McDonough ................. 375/216 | 6,044,257 | A | 3/2000 | Boling |
| 5,781,156 | A | 7/1998 | Krasner | 6,049,971 | A | 4/2000 | Petit |
| 5,784,422 | A | 7/1998 | Heermann | 6,055,434 | A | 4/2000 | Seraj |
| 5,786,789 | A | 7/1998 | Janky | 6,057,756 | A | 5/2000 | Engellenner |
| 5,790,842 | A | 8/1998 | Charles | 6,067,044 | A | 5/2000 | Whelan |
| 5,794,124 | A | 8/1998 | Ito | 6,067,457 | A | 5/2000 | Erickson |
| 5,796,808 | A | 8/1998 | Scott | 6,069,570 | A | 5/2000 | Herring |
| 5,797,091 | A | 8/1998 | Clise | 6,070,089 | A | 5/2000 | Brophy |
| 5,804,810 | A | 9/1998 | Woolley | 6,075,458 | A | 6/2000 | Ladner |
| 5,805,576 | A | 9/1998 | Worley, III | 6,076,099 | A | 6/2000 | Chen |
| 5,812,087 | A | 9/1998 | Krasner | 6,081,523 | A | 6/2000 | Merchant |
| 5,812,522 | A | 9/1998 | Lee | 6,091,969 | A | 7/2000 | Brophy |
| 5,815,114 | A | 9/1998 | Speasl | 6,097,760 | A | 8/2000 | Spicer |
| RE35,916 | E | 10/1998 | Dennison | 6,101,395 | A | 8/2000 | Keshavachar |
| 5,825,283 | A | 10/1998 | Camhi | 6,121,922 | A | 9/2000 | Mohan |
| 5,825,327 | A | 10/1998 | Krasner | 6,122,271 | A | 9/2000 | McDonald |
| 5,826,188 | A | 10/1998 | Tayloe | 6,122,514 | A | 9/2000 | Spaur |
| 5,831,574 | A | 11/1998 | Krasner | 6,131,067 | A | 10/2000 | Girerd |
| 5,832,394 | A | 11/1998 | Wortham | 6,131,366 | A | 10/2000 | Fukuda |
| 5,835,907 | A | 11/1998 | Newman | 6,133,874 | A | 10/2000 | Krasner |
| 5,838,237 | A | 11/1998 | Revell | 6,140,956 | A | 10/2000 | Hillman |
| 5,841,396 | A | 11/1998 | Krasner | 6,144,336 | A | 11/2000 | Preston |
| 5,841,842 | A | 11/1998 | Baum | 6,151,493 | A | 11/2000 | Sasakura |
| 5,842,141 | A | 11/1998 | Vaihoja | 6,154,658 | A | 11/2000 | Caci |
| 5,850,392 | A | 12/1998 | Wang | 6,166,688 | A | 12/2000 | Cromer |
| 5,856,986 | A | 1/1999 | Sobey | 6,169,497 | B1 | 1/2001 | Robert |
| 5,864,578 | A | 1/1999 | Yuen | 6,173,194 | B1 | 1/2001 | Vanttila |
| 5,864,763 | A | 1/1999 | Leung | 6,175,307 | B1 | 1/2001 | Peterson |
| 5,870,675 | A | 2/1999 | Tuutijarvi | 6,181,253 | B1 | 1/2001 | Eschenbach |
| 5,874,914 | A | 2/1999 | Krasner | 6,195,736 | B1 | 2/2001 | Lisle |
| 5,881,069 | A | 3/1999 | Cannon | 6,208,959 | B1 | 3/2001 | Jonsson |
| 5,881,373 | A | 3/1999 | Elofsson | 6,212,207 | B1 | 4/2001 | Nicholas |
| 5,884,214 | A | 3/1999 | Krasner | 6,226,529 | B1 | 5/2001 | Bruno |
| 5,886,634 | A | 3/1999 | Muhme | 6,236,652 | B1 | 5/2001 | Preston |
| 5,890,108 | A | 3/1999 | Yeldener | 6,249,227 | B1 | 6/2001 | Brady |
| 5,892,441 | A | 4/1999 | Woolley | 6,266,008 | B1 | 7/2001 | Huston |
| 5,892,454 | A | 4/1999 | Schipper | 6,269,392 | B1 | 7/2001 | Cotichini |
| 5,901,179 | A | 5/1999 | Urabe | 6,272,315 | B1 | 8/2001 | Chang |
| 5,911,129 | A | 6/1999 | Towell | 6,275,990 | B1 | 8/2001 | Dapper |
| 5,912,886 | A | 6/1999 | Takahashi | 6,282,430 | B1 | 8/2001 | Young |
| 5,913,170 | A | 6/1999 | Wortham | 6,288,645 | B1 | 9/2001 | McCall |
| 5,917,449 | A | 6/1999 | Sanderford | 6,295,461 | B1 | 9/2001 | Palmer |
| 5,918,180 | A | 6/1999 | Dimino | 6,300,863 | B1 | 10/2001 | Cotichini |
| 5,930,340 | A | 7/1999 | Bell | 6,300,875 | B1 | 10/2001 | Schafer |
| 5,930,722 | A | 7/1999 | Han | 6,301,480 | B1 | 10/2001 | Kennedy, III |
| 1,945,944 | A | 8/1999 | Krasner | 6,304,186 | B1 | 10/2001 | Rabanne |
| 5,933,468 | A | 8/1999 | Kingdon | 6,304,637 | B1 | 10/2001 | Mirashrafi |
| 5,936,526 | A | 8/1999 | Klein | 6,307,471 | B1 | 10/2001 | Xydis |
| 5,937,355 | A | 8/1999 | Joong | 6,308,060 | B2 | 10/2001 | Wortham |
| 5,940,598 | A | 8/1999 | Strauss | 6,320,535 | B1 | 11/2001 | Hillman |
| 5,946,304 | A | 8/1999 | Chapman | 6,321,091 | B1 | 11/2001 | Holland |
| 5,946,611 | A | 8/1999 | Dennison | 6,326,736 | B1 | 12/2001 | Kang |
| 5,949,335 | A | 9/1999 | Maynard | 6,327,533 | B1 | 12/2001 | Chou |
| 5,953,694 | A | 9/1999 | Pillekamp | 6,343,217 | B1 | 1/2002 | Borland |
| 5,960,363 | A | 9/1999 | Mizikovsky | 6,345,251 | B1 | 2/2002 | Jansson |
| 5,961,608 | A | 10/1999 | Onosaka | 6,351,495 | B1 | 2/2002 | Tarraf |
| 5,963,130 | A | 10/1999 | Schlager | 6,358,145 | B1 | 3/2002 | Wong |
| 5,963,134 | A | 10/1999 | Bowers | 6,359,923 | B1 | 3/2002 | Agee |
| 5,970,130 | A | 10/1999 | Katko | 6,362,736 | B1 | 3/2002 | Gehlot |
| 5,978,676 | A | 11/1999 | Guridi | 6,373,842 | B1 | 4/2002 | Coverdale |
| 5,991,279 | A | 11/1999 | Haugli | 6,405,033 | B1 | 6/2002 | Kennedy, III |
| 5,999,124 | A | 12/1999 | Sheynblat | 6,430,176 | B1 | 8/2002 | Christie, IV |
| 5,999,126 | A | 12/1999 | Ito | 6,434,198 | B1 | 8/2002 | Tarraf |
| 6,002,363 | A | 12/1999 | Krasner | 6,466,582 | B2 | 10/2002 | Venters |
| 6,006,189 | A | 12/1999 | Strawczynski et al. | 6,470,046 | B1 | 10/2002 | Scott |
| 6,009,325 | A | 12/1999 | Retzer | 6,477,633 | B1 | 11/2002 | Grimmett |
| 6,009,338 | A | 12/1999 | Iwata | 6,493,338 | B1 | 12/2002 | Preston |
| 6,011,973 | A | 1/2000 | Valentine | 6,516,198 | B1 | 2/2003 | Tendler |
| 6,014,089 | A | 1/2000 | Tracy | 6,519,260 | B1 | 2/2003 | Galyas |
| 6,014,090 | A | 1/2000 | Rosen | 6,522,265 | B1 | 2/2003 | Hillman |
| 6,014,376 | A | 1/2000 | Abreu | 6,526,026 | B1 | 2/2003 | Menon |
| 6,018,654 | A | 1/2000 | Valentine | 6,529,744 | B1 | 3/2003 | Birkler |

| | | |
|---|---|---|
| 6,611,804 B1 | 8/2003 | Dörbecker |
| 6,614,349 B1 | 9/2003 | Proctor |
| 6,617,979 B2 | 9/2003 | Yoshioka |
| 6,628,967 B1 | 9/2003 | Yue |
| 6,665,333 B2 | 12/2003 | McCrady |
| 6,677,894 B2 | 1/2004 | Sheynblat |
| 6,681,121 B1 | 1/2004 | Preston |
| 6,683,855 B1 | 1/2004 | Bordogna |
| 6,690,681 B1 | 2/2004 | Preston |
| 6,690,922 B1 | 2/2004 | Lindemann |
| 6,697,987 B2 | 2/2004 | Lee |
| 6,700,867 B2 | 3/2004 | Classon |
| 6,707,421 B1 | 3/2004 | Drury |
| 6,747,571 B2 | 6/2004 | Fierro et al. |
| 6,754,265 B1 | 6/2004 | Lindemann |
| 6,771,629 B1 | 8/2004 | Preston |
| 6,778,645 B1 | 8/2004 | Rao |
| 6,799,050 B1 | 9/2004 | Krasner |
| 6,836,515 B1 | 12/2004 | Kay |
| 6,845,153 B2 | 1/2005 | Tiburtius |
| 6,917,449 B2 | 7/2005 | Nakajima |
| 6,940,809 B2 | 9/2005 | Sun |
| 6,981,022 B2 | 12/2005 | Boundy |
| 6,993,362 B1 | 1/2006 | Aberg |
| 7,092,370 B2 | 8/2006 | Jiang |
| 7,103,550 B2 | 9/2006 | Gallagher |
| 7,151,768 B2 | 12/2006 | Preston |
| 7,164,662 B2 | 1/2007 | Preston |
| 7,206,305 B2 | 4/2007 | Preston |
| 7,206,574 B2 | 4/2007 | Bright |
| 7,215,965 B2 | 5/2007 | Fournier |
| 7,221,669 B2 | 5/2007 | Preston |
| 7,269,188 B2 | 9/2007 | Smith |
| 7,283,904 B2 | 10/2007 | Benjamin |
| 7,286,522 B2 | 10/2007 | Preston |
| 7,317,696 B2 | 1/2008 | Preston |
| 7,372,833 B2 | 5/2008 | Kyrönaho |
| 7,398,100 B2 | 7/2008 | Harris |
| 7,426,466 B2 | 9/2008 | Ananthapadmanabhan |
| 7,430,428 B2 | 9/2008 | Van Bosch |
| 7,477,906 B2 | 1/2009 | Radic |
| 7,483,418 B2 | 1/2009 | Maurer |
| 7,508,810 B2 | 3/2009 | Moinzadeh |
| 7,511,611 B2 | 3/2009 | Sabino |
| 7,512,098 B2 | 3/2009 | Jiang |
| 7,562,393 B2 | 7/2009 | Buddhikot |
| 7,583,959 B2 | 9/2009 | Holmes |
| 7,586,240 B2 | 9/2009 | Tsuda |
| 7,593,449 B2 | 9/2009 | Shattil |
| 7,606,555 B2 | 10/2009 | Walsh |
| 7,653,383 B2 | 1/2010 | Natarajan |
| 7,688,260 B2 | 3/2010 | Pomerantz |
| 7,701,954 B2 | 4/2010 | Rabenko |
| 7,733,853 B2 | 6/2010 | Moinzadeh |
| 7,747,281 B2 | 6/2010 | Preston |
| 7,809,367 B2 | 10/2010 | Hellaker |
| 7,848,763 B2 | 12/2010 | Fournier |
| 7,856,240 B2 | 12/2010 | Gunn |
| 7,924,934 B2 | 4/2011 | Birmingham |
| 7,979,095 B2 | 7/2011 | Birmingham |
| 7,983,310 B2 | 7/2011 | Hirano |
| 8,036,201 B2 | 10/2011 | Moinzadeh |
| 8,036,600 B2 | 10/2011 | Garrett |
| 8,068,792 B2 | 11/2011 | Preston |
| 2002/0022465 A1 | 2/2002 | McCullagh |
| 2002/0097706 A1 | 7/2002 | Preston |
| 2002/0111167 A1 | 8/2002 | Nguyen |
| 2002/0122401 A1 | 9/2002 | Xiang |
| 2003/0016639 A1 | 1/2003 | Kransmo |
| 2003/0212562 A1 | 11/2003 | Patel |
| 2003/0227939 A1 | 12/2003 | Yukie |
| 2004/0034529 A1 | 2/2004 | Hooper, III |
| 2004/0192345 A1 | 9/2004 | Osborn |
| 2005/0090225 A1 | 4/2005 | Muehleisen |
| 2005/0111563 A1 | 5/2005 | Tseng |
| 2005/0147057 A1 | 7/2005 | LaDue |
| 2005/0187882 A1 | 8/2005 | Sovio |
| 2005/0207511 A1 | 9/2005 | Madhavan et al. |
| 2005/0215228 A1 | 9/2005 | Fostick |
| 2005/0226202 A1 | 10/2005 | Zhang |
| 2005/0278169 A1* | 12/2005 | Hardwick .................. 704/223 |
| 2006/0059261 A1 | 3/2006 | Finkenzeller |
| 2006/0246910 A1 | 11/2006 | Petermann |
| 2006/0287003 A1 | 12/2006 | Moinzadeh |
| 2007/0087756 A1 | 4/2007 | Hoffberg |
| 2007/0124625 A1 | 5/2007 | Hassan |
| 2007/0155360 A1 | 7/2007 | An |
| 2007/0211624 A1 | 9/2007 | Schmidt |
| 2007/0258398 A1 | 11/2007 | Chestnutt |
| 2007/0264964 A1 | 11/2007 | Birmingham |
| 2008/0025295 A1 | 1/2008 | Elliott |
| 2008/0039017 A1 | 2/2008 | Kim |
| 2008/0056469 A1 | 3/2008 | Preston |
| 2008/0107094 A1 | 5/2008 | Borella |
| 2008/0132200 A1 | 6/2008 | Shinoda |
| 2008/0140394 A1 | 6/2008 | Holmes |
| 2008/0143497 A1 | 6/2008 | Wasson |
| 2008/0182570 A1 | 7/2008 | Kuhl |
| 2008/0212820 A1 | 9/2008 | Park |
| 2008/0266064 A1 | 10/2008 | Curran |
| 2008/0294340 A1 | 11/2008 | Schmidt |
| 2009/0055516 A1 | 2/2009 | Zhodzishsky |
| 2009/0077407 A1 | 3/2009 | Akimoto |
| 2009/0088180 A1 | 4/2009 | LaMance |
| 2009/0110033 A1 | 4/2009 | Shattil |
| 2009/0265173 A1 | 10/2009 | Madhavan |
| 2009/0298428 A1 | 12/2009 | Shin |
| 2009/0304057 A1* | 12/2009 | Werner et al. ............... 375/222 |
| 2009/0306976 A1* | 12/2009 | Joetten et al. .............. 704/214 |
| 2010/0197322 A1 | 8/2010 | Preston |
| 2010/0211660 A1 | 8/2010 | Kiss |
| 2011/0211625 A1 | 9/2011 | Birmingham |
| 2011/0287736 A1 | 11/2011 | Hirano |
| 2011/0312322 A1 | 12/2011 | Garrett |
| 2012/0040651 A1 | 2/2012 | Quimby |

FOREIGN PATENT DOCUMENTS

| | | |
|---|---|---|
| DE | 44 24 412 A1 | 1/1996 |
| EP | 0 242 099 A2 | 10/1987 |
| EP | 0 528 090 A1 | 8/1991 |
| EP | 0 512 789 A2 | 5/1992 |
| EP | 0 501 058 A2 | 9/1992 |
| EP | 0 545 753 A1 | 6/1993 |
| EP | 0 545 783 A1 | 6/1993 |
| EP | 0 580 397 A2 | 1/1994 |
| EP | 0 889 610 A2 | 1/1999 |
| EP | 0 896 442 A1 | 2/1999 |
| EP | 01 950 402 | 12/2004 |
| EP | 1 843 503 A2 | 10/2007 |
| GB | 2 290 005 A | 5/1994 |
| JP | 03232349 | 10/1991 |
| JP | 5130008 | 5/1993 |
| JP | 05-207107 | 8/1993 |
| JP | 5252099 | 9/1993 |
| JP | 6077887 | 3/1994 |
| JP | 11109062 | 4/1999 |
| JP | 2000-68925 | 3/2000 |
| JP | P3044064 | 3/2000 |
| JP | 2001-238256 | 8/2001 |
| TW | 2010/18163 A | 5/2010 |
| WO | WO 89/12835 A1 | 12/1989 |
| WO | WO 91/07044 A1 | 5/1991 |
| WO | WO 95/21511 A1 | 8/1995 |
| WO | WO 96/07110 A1 | 3/1996 |
| WO | WO 96/15636 A1 | 5/1996 |
| WO | WO 96/18275 A1 | 6/1996 |
| WO | WO 98/34164 A1 | 8/1998 |
| WO | WO 98/34359 A1 | 8/1998 |
| WO | WO 98/53573 A2 | 11/1998 |
| WO | WO 98/59256 A2 | 12/1998 |
| WO | WO 98/59257 A1 | 12/1998 |
| WO | WO 99/14885 A2 | 3/1999 |
| WO | WO 99/56143 A1 | 4/1999 |
| WO | WO 99/56144 A1 | 4/1999 |
| WO | WO 99/36795 A1 | 7/1999 |
| WO | WO 99/49677 A1 | 9/1999 |
| WO | WO 00/11893 A1 | 3/2000 |
| WO | WO 01/78249 A1 | 10/2001 |

| | | | |
|---|---|---|---|
| WO | WO 01/99295 A2 | 12/2001 | |
| WO | WO 02/054694 A1 | 7/2002 | |
| WO | WO 03/034235 A1 | 4/2003 | |
| WO | WO 03/081373 A2 | 10/2003 | |
| WO | 2009149356 | 12/2009 | |

OTHER PUBLICATIONS

Coleman, A., et al., "Subjective Performance Evaluation of the RPE-LTP Codec for the Pan-European Cellular Digital Radio System," Globecom '89, IEEE Global Telecommunications Conference and Exhibition, vol. 2, Nov. 27-30, 1989, pp. 758-761, IEEE, New York, New York.

Coleman, A., et al., "Subjective Performance Evaluation of the RPE-LTP Codec for the Pan-European Cellular Digital Mobile Radio System," Globecom '89, IEEE Global Telecommunications Conference and Exhibition, vol. 2, Nov. 27-30, 1989, pp. 1075-1079, IEEE, New York, New York.

Lin, D., et al., "Data Compression of Voiceband Modem Signals," 40th sup. th IEEE Vehicular Technology Conference: On the Move in the 90's. May 6-9, 1990, pp. 323-325, IEEE, New York, New York.

Feher, "MODEMS for Emerging Digital Cellular-Mobile Radio System," IEEE Trans. on Vehicular Technology, vol. 40, No. 2, May 1991, pp. 355-365.

Christ, Thomas W., "A Prison Guard Duress Alarm Location System," Proceedings of the IEEE 1993 International Carnahan Conference on Security Technology: Security Technology, Oct. 13-15, 1993, Copyright 1993 IEEE.

Brian W. Martin, "WatchIt: A Fully Supervised Identification, Location and Tracking System," Proceedings of the IEEE, 29th Annual 1995 International Carnahan Conference on Security Technology, Oct. 1995.

Reut, Anton B., "Remote Monitoring of Military Assets Using Commercial Leo Satellites," IEEE Universal Communications Conference Record, Nov. 6-8, 1995, Copyright 1995 IEEE.

Ayanoglu, E., "Adaptive ARQ/FEC for Multitone Transmission in Wireless Networks" Global Telecommunications Conference, 1995. Conference Record. Communication Theory Mini-Conference, Globecom '95., IEEE Singapore Nov. 13-17, 1995, New York, NY, USA, IEEE, US Lnkd. vol. 3. Whole Document.

Brown, et al., "A Reconfigurable Modem for Increased Network . . . " IEEE Trans. on Circuits & Systems for Video Technology, vol. 6, No. 2, Apr. 1996, pp. 215-224.

U.S. Appl. No. 60/047,034; dated May 19, 1997; Applicant: Preston.
U.S. Appl. No. 60/047,140; dated May 20, 1997; Applicant: Preston.
U.S. Appl. No. 60/048,369; dated Jun. 3, 1997; Applicant: Preston.
U.S. Appl. No. 60/048,385; dated Jun. 3, 1997; Applicant: Preston.
U.S. Appl. No. 60/055,497; dated Aug. 13, 1997; Applicant: Preston.

Mueller, A.J. et al., "A DSP Implemented dual 9600/7200 BPS TCM Modem for Mobile Communications Over FM Voice Radios," Proceedings of the 1997 6th IEEE Pacific rim Conference on Communications, Computers and Signal Processing, vol. 2, Aug. 20-22, 1997, pp. 758-761, IEEE, New York, New York.

Jain et al, Potential Networking Applications of Global Positioning Systems (GPS), downloadable at http://www.cis.ohio-state.edu/~jain/papers/gps.htm, pp. 1-40, Apr. 1996.

Werb, Jay and Colin Lanzl, "Designing a Positioning System for Finding Things and People Indoors," IEEE Spectrum, Sep. 1998.

FCC E911 Order, dated Nov. 23, 1998-Jul. 1, 1999.

Werb, Jay and Colin Lanzl, "The Next Generation of Control: Local Positioning," abstract, Feb. 1999, vol. 26.

Lemke A. C., et al.: "Voice Over Data and Data Over Voice: Evolution of the Alcatel 1000. Seamless Evolution of the Alcatel 1000 Switching System will Support the Move to Voice and Data Convergence." Electrical Communication, Alcatel. Brussels, BE, Apr. 1, 1999. Abstract; Figure 2.

Benelli G., et al.: "A Coding and Retransmission Protocol for Mobile Radio Data Transmission." Vehicular Technology Conference, 1999. VTC 1999—Fall. IEEE VTS 50th Amsterdam Netherlands Sep. 19-22, 1999. Abstract Section II.

Vaha-Sipila, A., URLs for Telephone Calls, Request for Comments: 2806, Network Working Group, Apr. 2000, 16 pages.

International Search Report PCT/US00/13288; dated May 15, 2000; Applicant: Integrated Data Communications Inc.

International Search Report PCT/US00/01157; dated May 23, 2000; Applicant: Integrated Data Communications Inc.

Lavigne, R.E. and P. Eng, "Trunking Versus Conventional Radio System," Proceedings of the IEEE, 34th Annual 2000 International Carnahan Conference on Security Technology, Oct. 23-25, 2000.

International Search Report PCT/US01/19845; dated Jun. 22, 2001; Applicant: Airbiquity, Inc.

International Search Report PCT/US01/20021, dated Aug. 21, 2001; Applicant: Airbiquity, Inc.

International Search Report PCT/US01/27238; dated Aug. 30, 2001; Applicant: Airbiquity, Inc.

Bilbao, Alfonso, m-Security (Security and Mobile Telephony), Proceedings of the IEEE 35th Annual 2001, International Carnahan Conference on Security Technology, Oct. 16-19, 2001.

Office Action in U.S. Appl. No. 09/677,486 dated Oct. 16, 2001; 9 pages.

McNichols, Shawn, "Keeping Your Assets Safe," published on the Internet at http://www.securitymagazine.com,CDA/ArticleInformation/features/BNP_Features, posted Feb. 14, 2002, Copyright 2001-2002 by Business News Publishing Co.

"Tracking," published on the Internet at http://www.wisetrack.com/tracking.html, posted May 29, 2002, Copyright 2001 by TVL, Inc.

Janus Technologies, Inc., "ProxTrak Asset Tracking Interface," copyright 2000 Janus Technologies, Inc., published on the Internet at http://www.janus-tech.com/Products/ProxTrax. html, printed May 29, 2002.

Lockwood Technology Corporation, "Asset Management," copyright 2002 by Lockwood Technology Corporation, published on the Internet at http://www.lockwoodtechnology.com/ asset_tracking. html, printed May 29, 2002.

International Search Report PCT/US02/00996; dated Jun. 24, 2002; Applicant: Airbiquity, Inc.

Office Action in U.S. Appl. No. 09/625,159 dated Apr. 9, 2003; 15 pages.

3GPP2 Access Network Interfaces Technical Specification Group, "3GGP2 Access Network Interfaces TSG (TSG-A) #60, Meeting Summary," Coeur d'Alene, Idaho, Apr. 19, 2004, pp. 1-5.

3rd Generation Partnership Project; Technical Specification Group Services and System Aspects Push Architecture (Rel. 6); 3GPP TR 23.976; vol. 3-SA2, No. V6.1.0; Jun. 1, 2004; pp. 1-34.

Universal Mobile Telecommunications System (UMTS); Push Architecture (3GPP TR 23.976 version 6.1.0 Release 6); Jun. 2004; 36 pages.

Protean Research Group, "Anycast Routing for Mobile Services (ARMS) Project Overview," Published on the Internet at <http://tang.itd.nrl.navy.mll/5522/anycast/anycast_index.html>. Downloaded from the internet Jan. 19, 2005.

Vocal Technologies, Ltd. Home Page, "Audio Codecs," http://www.vocal.com/data_sheets/audio_codecs.html?glad, accessed Jun. 12, 2005.

International Search Report for PCT/US06/03416, dated Feb. 5, 2007, 3 pages.

Phifer, Lisa A., Surfing the Web Over Wireless, Jan. 1998, http://www.corecom.com/html/ wireless.html, printed May 22, 2007.

International Search Report of International Application No. PCT/US07/64443, dated Sep. 15, 2008.

USPTO Search Authority; PCT/US08/80555 International Search Report; Dec. 19, 2008, 11 pages.

PCT/US2009/056834 International Search Report dated Dec. 30, 2009; 12 pages.

Stolowitz Ford Cowger LLP List of Related Cases dated Dec. 23, 2011.

* cited by examiner

FIG. 1 (Background)

FIG. 2 (Background)

ADAPTIVE DATA TRANSMISSION FOR A DIGITAL IN-BAND MODEM OPERATING OVER A VOICE CHANNEL

This application is a non-provisional of U.S. Provisional Application No. 61/263,672 filed on Nov. 23, 2009, entitled: ADAPTIVE DATA TRANSMISSION FOR A DIGITAL IN-BAND MODEM OPERATING OVER A VOICE CHANNEL which is herein incorporated by reference in its entirety.

COPYRIGHT NOTICE

© 2009 Airbiquity, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND OF THE INVENTION

Wireless telecommunication coverage has become nearly ubiquitous in much of the world, especially in industrialized countries. In some developing countries as well, whole regions that lack traditional copper-wired telecom infrastructure have skipped over that technology to deploy wireless instead. Modern wireless networks provide a range of voice and data services. Technical details of those services can be found in many places, for example, the 3GPP standards group web site www.3gpp.org.

Some wireless data services, however, are slow, and coverage is spotty. "SMS" (short message service) is one example. Wireless voice services, by contrast, tend to be of generally good quality and are available almost everywhere people travel. Therefore, voice services are a good choice where reliable, broad coverage is important, for example in the implementation of emergency services, such as requests for police, fire, medical or other emergency services. When people are traveling, especially in motor vehicles, effective wireless communication to reach emergency services is essential.

We refer to "in-band" communications as meaning in the voice channel, as distinguished from a data channel, control channel or other non-voice wireless service Importantly, voice channels, although optimized for efficient transmission of actual human voice traffic, in fact can be used to transmit relatively small amounts of data as well (e.g., tens or hundreds of bits, rather than megabits.) Voice channels are characterized by special performance characteristics. For example, only a relatively narrow range of audio frequencies needs to be transceived, based on the normal human voice. In fact, sophisticated compression and coding techniques are known to enable sending and receiving human voice very efficiently over digital wireless networks. However, these voice coders or "vocoders"—typically implemented in software, DSP chips and the like—do not transmit non-voice sounds well at all. To the contrary, they are carefully designed to filter out non-voice signals.

Figure 1:
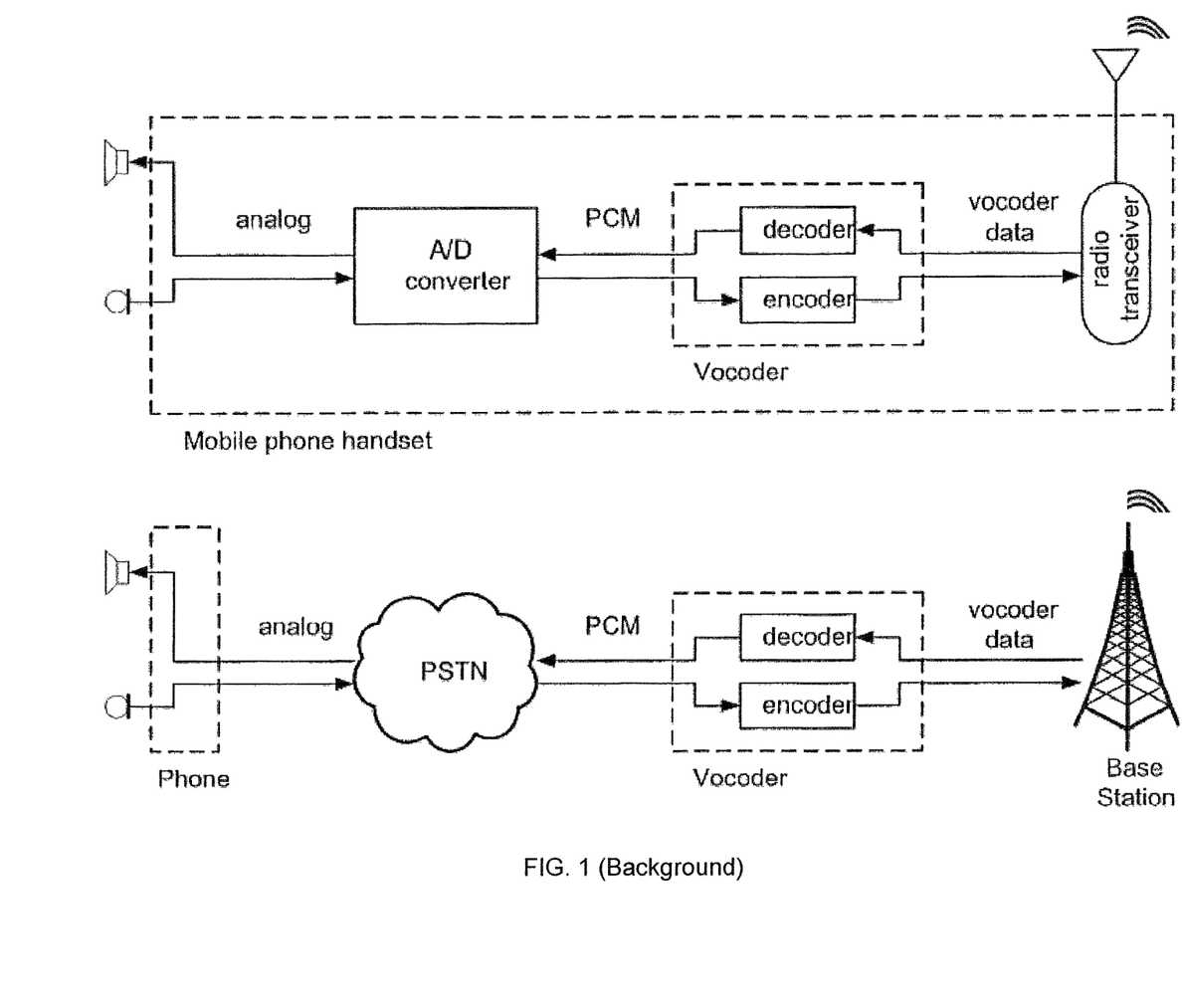
FIG. 1 is a simplified block diagram illustrating the typical speech path for a wireless voice call.

FIG. 1 is a simplified block diagram illustrating the typical speech path for a wireless voice call; i.e., a telephone call over the wireless telecommunications network. Analog voice signals from a microphone are digitized by an A/D converter, and then fed to a vocoder encoding algorithm (at 8000 samples/sec). The encoder produces packets of compressed data (typically one packet per 20-ms frame of audio) and feeds this data stream to a radio transceiver. On the other side, a radio receiver passes the packets to the decoding algorithm, which then reconstructs (imperfectly) the original voice signal as a PCM stream. This PCM stream is eventually converted back into an analog voltage which is then applied to a speaker.

Using this type of system, modest amounts of data (here we mean user data, not vocoder speech data) can be transmitted "in-band" through careful selection of frequencies, timing, and the use of special techniques that "trick" a vocoder into transmitting information by making that information "look like" human voice data. This type of data communication, using the voice channel of a wireless system, is sometimes called "in-band signaling." It can be implemented in hardware and or software referred to as an "in-band signaling modem," borrowing the old modem term (modulator-demodulator) familiar in traditional "land line" telecommunications.

Several issued patents disclose in-band signaling technology that communicates digital data over a voice channel of a wireless telecommunications network. In one example, an input receives digital data. An encoder converts the digital data into audio tones that synthesize frequency characteristics of human speech. The digital data is also encoded to prevent voice encoding circuitry in the telecommunications network from corrupting the synthesized audio tones representing the digital data. An output then outputs the synthesized audio tones to a voice channel of a digital wireless telecommunications network. In some cases, the data carrying "tones" are sent along with simultaneous voice. The tones can be made short and relatively unobtrusive. In other implementations, sometimes called "blank and burst," the voice is cut off while data is transmitted through the voice channel. In still other implementations, portions of the audio frequency spectrum are used for voice, while other portions are reserved for data. This aides in decoding at the receiving side.

Figure 2:
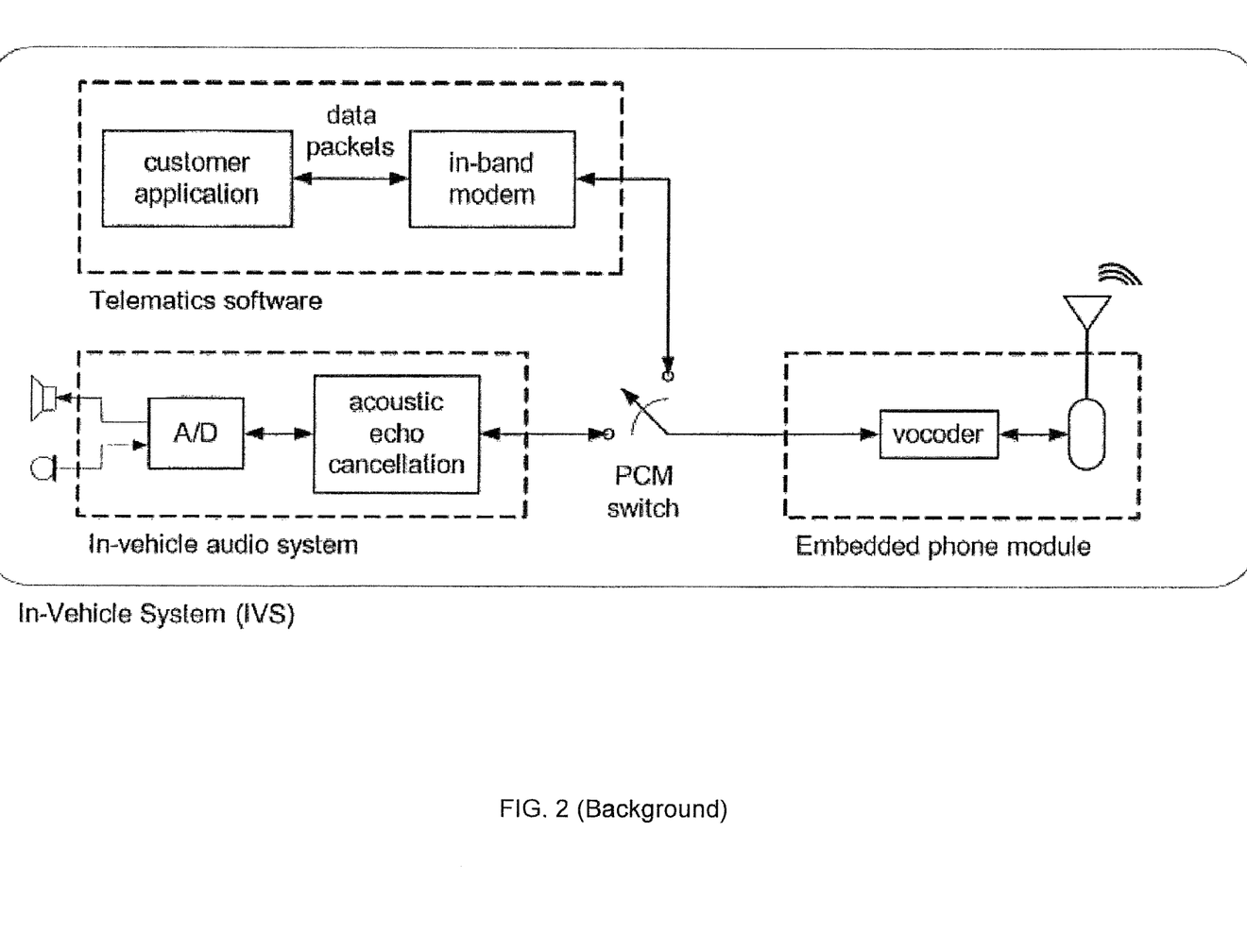
FIG. 2 is a simplified block diagram of an illustrative In-Vehicle System (IVS) with an embedded mobile phone module.

Today, many vehicles have some capability for communications over a wireless network. We refer to these vehicle systems as a telematics client system. FIG. 2 is a simplified block diagram of an illustrative In-Vehicle System (IVS). It shows an example of the relevant portion of a typical telematics client system. This client system consists of embedded hardware and software designed to operate in an automobile environment.

In FIG. 2, the telematics software includes a "customer application," which may be almost any application, in particular one that employs data transfer via the wireless network. For example, the customer application may relate to navigation or entertainment. In operation, the customer application conveys data (preferably data packets) to an in-band signaling modem. The in-band modem converts the data (along with packet headers and other overhead as appropriate) into audio tones. The audio "data tones" are encoded, much like voice content, and transmitted to a remote receiver.

As in any communication system, errors can occur in the process of in-band signaling. For example, the receiver will attempt to recover data packets from the transmitted data tones, but the recovery process could fail or the recovered packets could be incorrect representations of the original packets. Although there are schemes available to conduct a re-transmission from the transmit side in the event of an error, as well as schemes to correct errors on the receive side, what is needed is a scheme to reduce the number of errors to be resolved by the re-transmission and/or error correction schemes. The disclosure that follows solves this and other problems.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one example, a mobile device encodes a digital bitstream using a particular set of modulation parameters to generate an audio signal that has different audio tones selected to pass through a vocoder of the mobile device. The particular set of modulation parameters is optimized for a subset of a plurality of vocoding modes without a priori knowledge of which one of the vocoding modes is currently operated by the vocoder. The mobile device conducts transmissions over the wireless telecommunications network through the vocoder using the particular set of modulation parameters, and monitors these transmissions for errors. If the errors reach a threshold, then the vocoder may be using one of the vocoding modes that are not included in the subset for which the particular set of modulation parameters is optimized, and accordingly, the modulation device switches from the particular set of modulation parameters to a different set of modulation parameters. Additional aspects and advantages of this invention will be apparent from the following detailed description of preferred embodiments, which proceeds with reference to the accompanying drawings.

DETAILED DESCRIPTION OF PREFERRED EMBODIMENTS

Figure 3A:
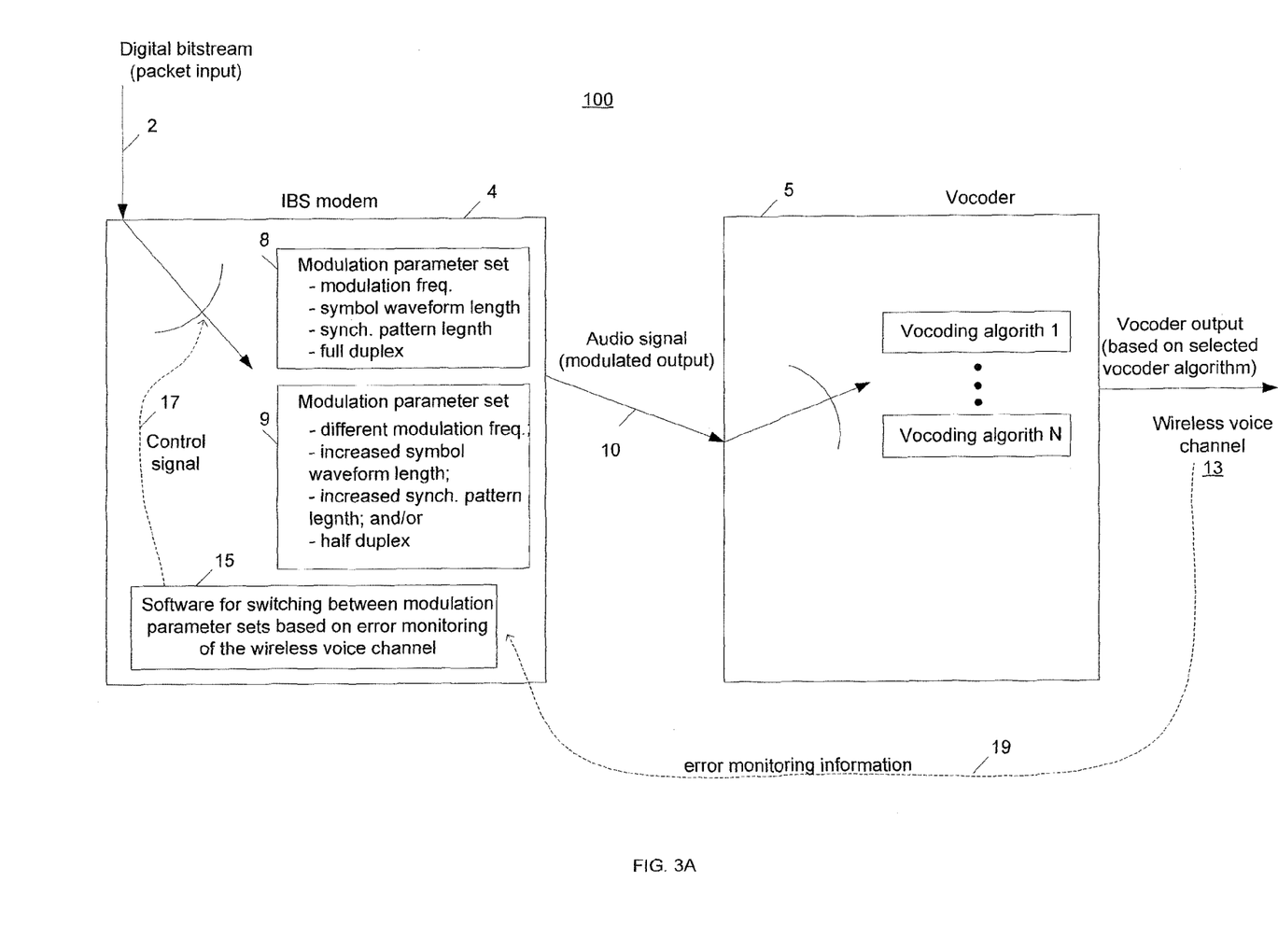
FIG. 3A illustrates an In-Band Signaling (MS) modem configured to switch between modulation parameter sets.

FIG. 3A illustrates an In-Band Signaling (IBS) modem configured to switch between modulation parameter sets.

The system 100 includes an In-Band Signaling (113S) modem 4 of a mobile device (also referred to as a "client") to communicate with a remote IBS modem such as an IBS modem of a server (not shown). The IBS modem 4 is configured to modulate packet data using a first set of modulation parameters 8. The software 15 of the IBS modem 4 monitors for errors associated with transmission to the remote IBS modem (not shown) over the wireless voice channel 13 and, according to said error monitoring, controls whether the system 100 (including the IBS modem 4) "falls back" to a second set of modulation parameters 9 during transmission.

By way of background, the vocoders such as vocoder 5 process voice data according to a vocoding algorithm, or vocoding codec, configured thereon. There are many known vocoding algorithms and the vocoders do not always reveal which particular vocoding algorithm they use. To further complicate matters, some vocoders such as the illustrated vocoder 5 are configured with a plurality of vocoding algorithms and will dynamically switch between which vocoding algorithm is currently utilized at any time for reasons that are outside the scope of this discussion (such dynamic switching may not necessarily be advertised by the vocoder either).

As explained previously, the modulation of packet data by an IBS modem into an audio signal 10 is to get the information of the packet data into a form that will not be filtered out by vocoders of the wireless voice channel. However, different vocoding algorithms process inputs in different ways, and in some cases so differently that a modulation scheme that can pass information sufficiently accurately through one vocoding algorithm will not pass information sufficiently accurately through another vocoding algorithm.

In the system 100, the IBS modem 4 is configured with at least two sets of modulation parameters, e.g. 8 and 9, which each represent a modulation scheme. The modulation schemes can differ in one or more of the following parameters: modulation frequency, symbol waveform length, synchronization pattern length, or full/half duplex transmission. One of the modulation schemes 8 and 9 is optimized for use with a subset of known vocoding algorithms, meaning that this modulation scheme will typically be able to pass information through the vocoding algorithms of the subset at high performance, but not necessarily through other vocoding algorithms Another one of the modulation schemes 8 and 9 is either optimized with a different subset of known vocoding algorithms, or not optimized with any particular vocoding algorithms (characterized by wide compatibility with vocoding algorithms at a lower performance).

The IBS modem 4 utilizes a particular one of the modulation schemes 8 and 9 in a "default mode" without analyzing which particular vocoding scheme is currently used by the vocoder 5. For example, in the example system 100 the high performance modulation scheme that is optimized for a subset of the vocoding algorithms 1-N is used initially for transmission. The use of this particular modulation scheme can be referred to as "a priori" because the IBS modem 4 does not have actual information as to which one of the vocoding algorithms 1-N (or for that matter which one of any known vocoding algorithms) the vocoder 5 is currently using.

The software 15 then continuously monitors transmission utilizing the particular one of the modulation schemes 8 and 9. In other words, actual error monitoring information 19 is fed back to the software 15. If the error monitoring information 19 indicates that a threshold amount of errors has been reached, the software 15 causes the IBS modem 4 to switch modulation schemes, which is represented logically in FIG. 3 by the control signal 17. In the particular example shown, the IBS modem 4 "falls back" to a modulation scheme that has one or more of the following parameters with respect to the default modulation scheme: different modulation frequency, greater symbol waveform length, greater synchronization pattern length, and half duplex transmission instead of full duplex transmission. Changing modulation frequency can prevent data from being filtered out by the utilized vocoding algorithm. A modulation scheme with a greater symbol waveform length supplies more waveform information to the receiver for the purposes of identifying the transmitted symbol, and such symbols are typically more likely to be recovered correctly in a "bad channel" environment, e.g. a vocoder using a vocoding scheme that is hostile to packet data. In one example, in one modulation scheme the symbols are four times longer than in another modulation scheme. A modulation scheme with a greater synchronization pattern length uses longer synchronization patterns to signal the remote IBS modem of the start of a payload, which is less likely to result in false or missed detections on the receive side in a "bad channel" environment. Using half duplex can avoid cross-talk between the IBS modems.

One particular example of the modulation schemes 8 and 9 is as follows. A first one of the modulation schemes has a data symbol rate of 400 baud with modulation frequencies F1/F2 and F3/F4 for the transmitter and receiver, respectively. Since the transmitter and receiver sides use different frequencies, there is no (or minimal) interference between the waveforms despite the temporal overlap, and full-duplex operation is possible. A second fallback one of the modulation schemes has a data symbol rate of 100 baud with a symbol length four times that of the first modulation scheme. The modulation frequencies are F1/F2 for both the transmitter and the receiver, and half duplex transmission mode is used. Unlike the first modulation scheme, the second fallback modulation scheme does not use the F3/F4 modulation frequencies as the 4.8 kbps EVRC-B vocoding algorithm suppresses these modulation frequencies.

If the IBS modem 4 does switch from a default modulation scheme to a fallback modulation scheme, the IBS modem 4 in turn signals the remote IBS modem to begin demodulating according to the fallback modulation scheme. As a result, errors resulting from the use of a modulation scheme that does not correspond to the currently utilized one of the vocoding algorithms can cease, reducing re-transmissions and processing associated with error correction. It should be understood that the more robust fallback modulation scheme can also addresses errors attributable to conditions of the wireless voice channel medium, e.g. dropped calls and lost packets, and/or errors attributable to another network such as a circuit switched medium.

It should be understood that the software 15 can also be configured to switch back to the default modulation scheme after utilizing the fallback modulation scheme for some period of time. For example, the software 15 could automatically switch back if a threshold minimum of errors are observed over a preset period of time.

As explained previously, vocoders typically do not reveal which particular vocoding algorithm they use. However, there are some "hostile" vocoders, e.g. vocoders that aggressively filter out non-speech data, which have characteristics revealing their vocoding algorithm. One particular example is the 4.8 kbps EVRC-B vocoding algorithm used by some vocoders. Accordingly, the IBS modem 4 can be configured to, when paired with a vocoder using these particular vocoding schemes, initially modulate the digital bitstream using the fallback modulation scheme. For example, if the identified vocoding algorithm is not included in the subset of vocoding algorithms for which the high performance modulation scheme is optimized, a bad channel can be declared immediately, and as a result the IBS modem 4 modulates the initial portion of the digital bitstream 2 using the fallback modulation scheme.

The modulation scheme described above can utilize a frequency modulation scheme such as Frequency-Shift Keying (FSK) modulation. If a frequency modulation scheme is used, information can be encoded with a selected pair of frequencies, or encoded with a larger set of frequencies, i.e. sets of more than two frequencies. It should be apparent that the principles described above can be applied to other modulation schemes, such as those where information is encoded using other signal characteristics including but not limited to phase or amplitude of the carrier frequency.

Figure 3B:
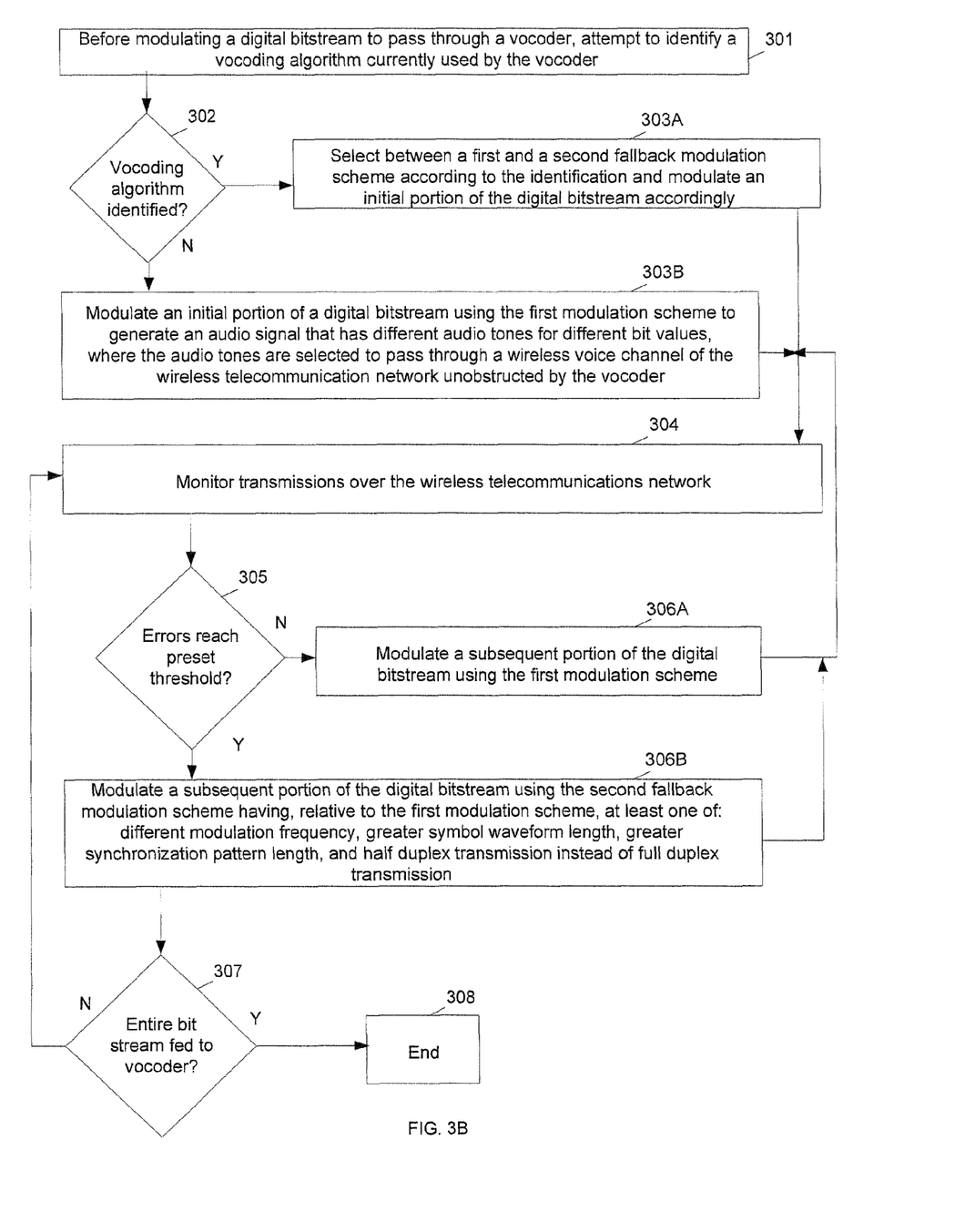
FIG. 3B illustrates a flow chart showing operation of the MS modem of FIG. 1.

FIG. 3B illustrates a flow chart showing operation of the IBS modem of FIG. 1.

In block 301, the IBS modem 4 attempts to identify a vocoding algorithm currently used by the vocoder. If a vocoding algorithm is identified in diamond 302, then in block 303A the IBS modem 4 selects between a first modulation scheme and a second fallback modulation scheme according to the identification. Otherwise, in block 303B the IBS modem 4 modulates an initial portion of a digital bitstream using the first modulation scheme to generate an audio signal that has different audio tones for different bit values, wherein the audio tones are selected to pass through a wireless voice channel of the wireless telecommunication network unobstructed by the vocoder.

In block 304, the IBS modem 4 monitors transmissions over the wireless telecommunications network. Examples of such monitoring will be discussed later in greater detail with respect to FIGS. 4 and 5A-B. If errors are less than a preset threshold in diamond 305, then in block 306A the IBS modem 4 modulates a subsequent portion of the digital bitstream using the first modulation scheme. If errors reach the preset threshold in diamond 305, then in block 306B the IBS modem 4 modulates a subsequent portion of the digital bitstream using the second fallback modulation scheme. As discussed previously, as compared to the first modulation scheme, the second fallback modulation scheme has at least one of different modulation frequency, greater symbol waveform length, greater synchronization pattern length, and half duplex transmission instead of full duplex transmission.

If the entire bitstream is fed to the vocoder in block 307, then the process ends in block 308. Otherwise, the process returns to monitoring in block 304.

Figure 4:
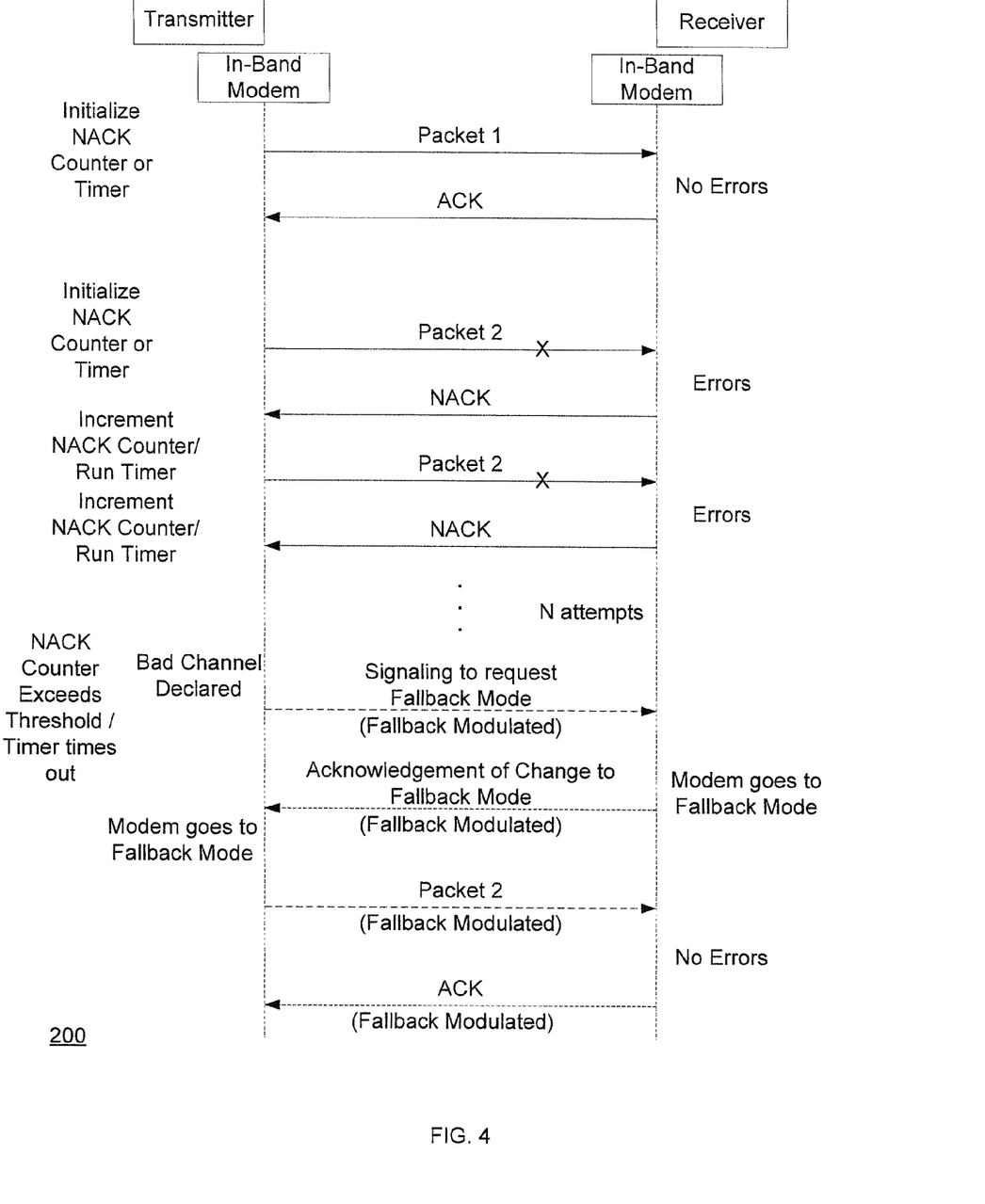
FIG. 4 illustrates a signaling diagram showing how the IBS modem shown in FIG. 1 can determine when to switch between modulation parameter sets.

FIG. 4 illustrates a signaling diagram showing how the IBS modem shown in FIG. 1 can determine when to switch between modulation parameter sets.

In the system 200, a transmitting IBS modem determines when to switch between modulation schemes based on counting non-acknowledgements. Non-acknowledgements include negative acknowledgements as shown in this particular illustration and any other indication of a transmission error such as a failure to receive a positive acknowledgement within a preset amount of time.

For example, the transmitting IBS modem modulates a first packet using a first modulation scheme and transmits the modulated packet. For purposes of illustration, assume that the modulated packet is successfully recovered and an acknowledgement is received back at the transmitting IBS modem.

The transmitting IBS modem modulates a second packet using the first modulation scheme. For purposes of illustration, assume that the modulated packet is not successfully recovered. The receiving IBS modem sends a negative acknowledgement, which as discussed previously is a type of non-acknowledgement. The transmitting IBS modem increments a counter for non-acknowledgements. The transmitting modem then re-transmits the second packet modulated using the first modulation scheme.

As subsequent non-acknowledgements are received (again either negative acknowledgements or any other indication of a transmission error) the counter continues to increment on the transmitting IBS. After the counter reaches a preset threshold of errors, a bad channel is declared and subsequent transmissions are made using the second fallback modulation scheme. For example, in this particular illustration the threshold is reached while still attempting to communicate the second packet, so the second packet is modulated according to the second fallback modulation scheme and then transmitted. It should be understood that hysteresis can be used in counting to avoid premature switchover to the second fallback modulation scheme.

As explained previously, the transmitting IBS modem also signals the receiving IBS modem to switch modulation schemes. It is preferable to send such signaling using the second fallback modulation scheme. Of course, this means that the receiving IBS modem is configured to demodulate signaling sent with the second fallback modulation scheme even when operating on packet data using the first modulation scheme. The transmitting IBS modem can wait to initiate modulation according to the second fallback modulation scheme until the receiving IBS modem positively indicates that the receiving IBS modem has begun operating in fallback modem.

It should be understood that, in the case of a download from the server to the mobile client, the server performs the functions of the transmitting IBS modem. Conversely, in the case of an upload from the mobile client to the server, the mobile client performs the functions of the transmitting IBS modem.

After some period of time, the transmitting IBS modem can initiate switchover back to the first modulation scheme. The switchover back to the first modulation scheme can occur automatically after the passage of a preset amount of time, or after the passage of the preset amount of time but only if less a particular amount of errors were detected in that time, etc. If the errors were resulting from temporarily problems with the wireless telecommunications network medium, it is possible that transmission using the first modulation scheme can be relatively error free at that time. Also, if the errors were resulting from a temporary use of a particular vocoding algorithm by a vocoder along the call path, it is possible that transmission using the first modulation scheme can be relatively error free at that time.

Figure 5A:
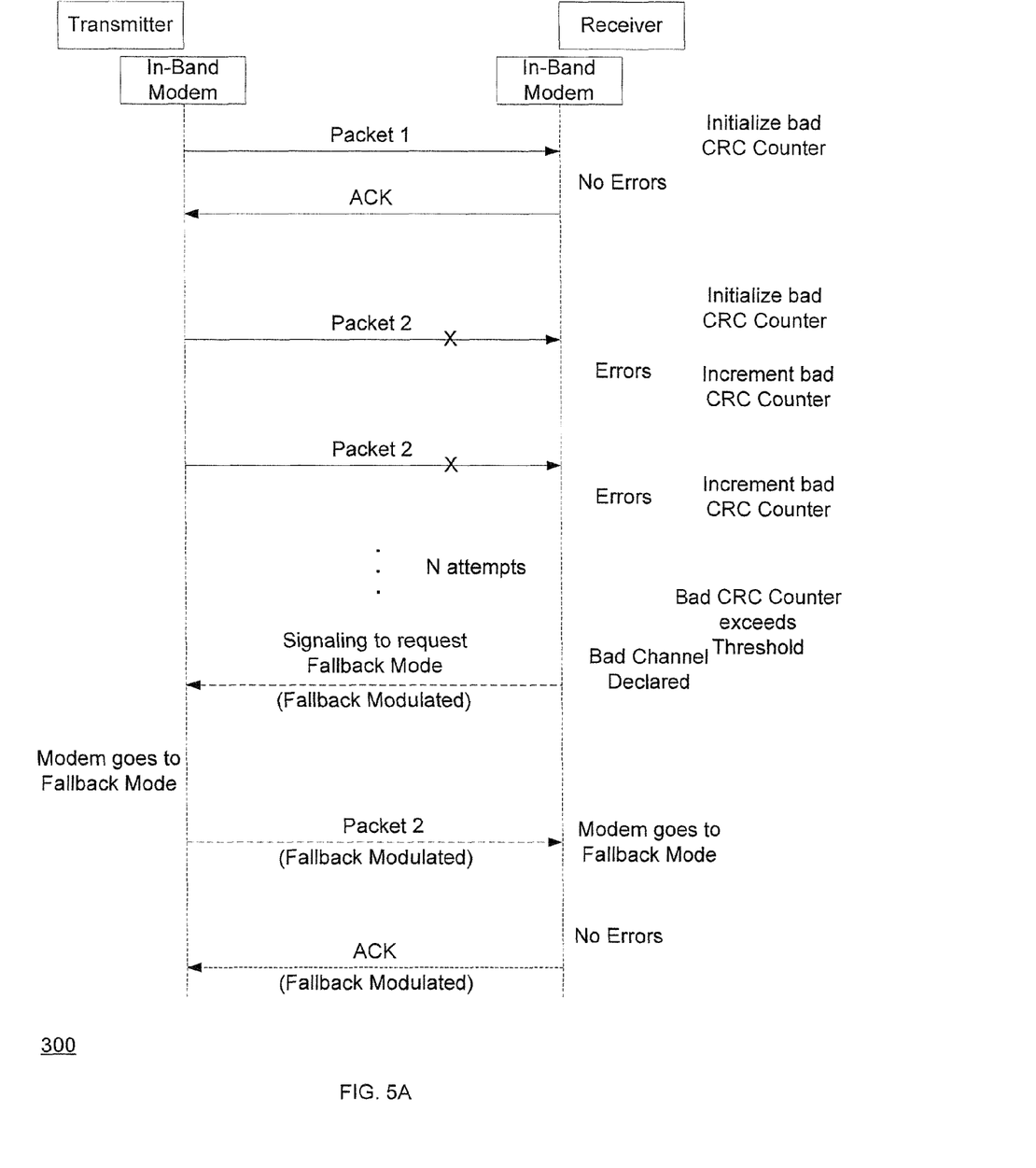
FIG. 5A illustrates a signaling diagram showing how an MS modem on the receiving side can determine when to switch between modulation parameter sets and signal the IBS modem of FIG. 1.

FIG. 5A illustrates a signaling diagram showing how an IBS modem on the receiving side can determine when to switch between modulation parameter sets and signal the IBS modem of FIG. 1.

In the system 300, a receiving IBS modem determines when to switch between modulation schemes based on counting errors detected using Cyclic Redundancy Check (CRC) error detecting or some other form of error detection.

For example, the receiving IBS modem receives a first packet modulated according to a first modulation scheme. The receiving IBS modem then performs a CRC on the recovered data of the first packet. For purposes of illustration, it is assumed that no errors are identified during this CRC. The receiving IBS modem may send an acknowledgement that the first packet was successfully recovered.

The receiving IBS modem then performs a CRC on a second packet modulated according to the first modulation scheme. For purposes of illustration, it is assumed that this CRC identifies errors. The receiving IBS modem then updates a counter. The receiving IBS modem may send a negative acknowledgement.

As subsequent errors are discovered, the counter continues to increment on the transmitting IBS. After the counter reaches a preset threshold of errors, a bad channel is declared. It should be understood that hysteresis can be used in counting to avoid premature switchover to the second fallback modulation scheme.

The receiving IBS modem then sends a request to switch modulation schemes, causing the transmitting modem to re-transmit a packet using the second fallback modulation scheme (or begin sending not yet transmitted packets using the fallback modulation scheme). As before, the request itself is modulated according to the second fallback modulation scheme. Of course, this means that the transmitting IBS modem is configured to demodulate signaling sent with the second fallback modulation scheme even when operating on packet data using the first modulation scheme.

Figure 5B:
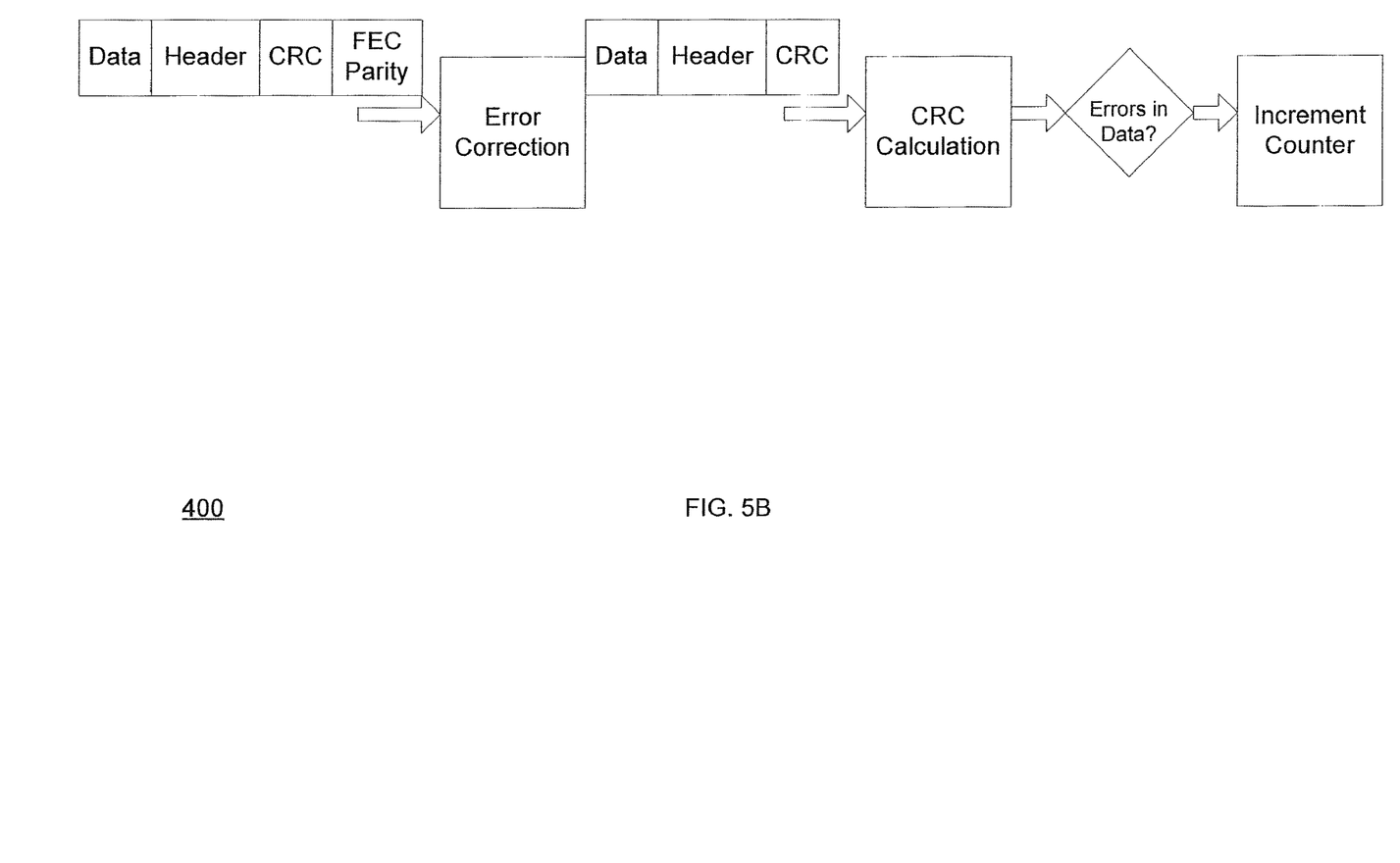
FIG. 5B is a flow chart illustrating error counting on the receiver side.

FIG. 5B is a flow chart illustrating error counting on the receiver side.

In the flowchart 400 the Forward Error Correction (FEC) parity bits are used to correct the packet data before the CRC calculation is performed. It should be apparent that any form of error correction can be performed before conducting the CRC or other error detection process. The error detection can be performed on the header, the payload (marked "data" in the figure), or both.

It should be understood that the packets are typically segmented for transmission. Accordingly, the counter may be incremented once for each erroneous segment (a segment is combination of a header and a payload that corresponds to a portion of a packet).

In one example, a processor readable medium is encoded with specialized instructions that, if executed, result particular operations. One operation includes processing a received digital bitstream using a particular modulation parameter set to generate an audio signal that has different audio tones for different bit values, wherein the audio tones are selected to pass through a wireless voice channel of a wireless telecommunication network unobstructed by a vocoder, and wherein the particular modulation parameter set is optimized for a subset of a plurality of vocoding modes without a priori knowledge of which one of the plurality of vocoding modes is currently operated by the vocoder for vocoding the audio signal. Another operation includes monitoring transmissions over the wireless telecommunications network to identify when an amount of errors associated with transmission over the wireless voice channel reaches a preset threshold. Another operation includes switching from the particular modulation parameter set to a different modulation parameter set if the monitoring indicates the error amount reaching the preset threshold. In some cases, at least some of the errors result from the vocoder operating a vocoding mode that is not included in the subset to which the particular modulation parameter set is optimized in association with the erroneous transmission.

The different modulation parameter set can be designed for wider compatibility than the particular modulation parameter set, and wherein the different modulation parameter set is non-optimized with said subset of vocoding modes and/or optimized with a different subset of vocoding modes.

Another operation can include, if the monitoring indicates the error amount reaching the preset threshold, transitioning from encoding using a first symbol type to encoding using a second symbol type having a greater duration than the first symbol type.

Another operation can include, if the monitoring indicates the error amount reaching the preset threshold, transitioning from encoding using a first frequency pair to encoding using a second lower frequency pair, wherein the first higher frequency pair is used with the erroneous transmissions.

Another operation can include, if the monitoring indicates the error amount reaching the preset threshold, encoding into the audio signal a first pattern, wherein the first pattern supplies more waveform information for the receiver to use in identifying a symbol than a second pattern encoded into the audio signal before the erroneous transmission is identified.

Another operation can include, if the monitoring indicates the error amount reaching the preset threshold, transitioning from encoding using a first symbol type to encoding using a second symbol type having a greater duration than the first symbol type, transitioning from encoding using a first frequency set to encoding using a second different frequency set, and encoding into the audio signal a first pattern, wherein the first pattern supplies more waveform information for the receiver to use in identifying a symbol than a second pattern encoded into the audio signal before the erroneous transmission is identified.

Another operation can include, if the monitoring indicates the error amount reaching the preset threshold, switching from a full-duplex transmission mode to a half-duplex transmission mode.

Another operation can include counting a number of non-acknowledgements, wherein the switching is based on said counting.

Another operation can include processing signaling generated by a receiving endpoint, wherein the switching is based on said signaling.

In another example, a particular process is provided. One step in the process includes processing a received digital bitstream using a particular modulation parameter set to generate a audio signal that has different audio tones for different bit values, wherein the audio tones are selected to pass through a wireless voice channel of a wireless telecommunication network unobstructed by a vocoder, wherein the particular modulation parameter set is optimized for a subset of a plurality of vocoding modes without a priori knowledge of which one of the plurality of vocoding modes is currently operated by the vocoder for vocoding the audio signal. Another step in the process includes feeding back actual error information from a demodulation endpoint for the transmissions. Another step in the process includes switching from the particular modulation parameter set to a different modulation parameter set when the fed back error information indicates errors reaching a preset threshold. In some cases, the different modulation parameter set is non-optimized with said subset of vocoding modes and/or optimized with a different subset of vocoding modes.

Another step in the process includes transitioning from encoding using a first symbol type to encoding using a second symbol type having a greater duration than the first symbol type when the fed back error information indicates errors reaching the preset threshold.

Another step in the process includes transitioning from encoding using a first frequency set to encoding using a second lower frequency set when the fed back error information indicates errors reaching a preset threshold, wherein the first higher frequency set is used with the erroneous transmissions.

Another step in the process includes encoding into the audio signal a first pattern, wherein the first pattern supplies more waveform information for the receiver to use in identifying a symbol than a second pattern encoded into the audio signal before the preset threshold is reached.

In another example, a processor readable medium is encoded with specialized instructions that, if executed, result particular operations. One operation includes determining whether a vocoder is currently operating a particular one or ones of a plurality of vocoding modes. Another operation includes processing a received digital bitstream using a particular modulation parameter set to generate a audio signal that has different audio tones for different bit values, wherein the audio tones are selected to pass through a wireless voice channel of a wireless telecommunication network unobstructed by the vocoder; wherein if the determination indicates that the vocoder is currently operating the particular one or ones of a plurality of vocoding modes, the particular modulation parameter set has a first set of parameters, and wherein otherwise the particular modulation parameter set has a second different set of parameters. Another operation includes monitoring transmissions over the wireless telecommunications network to identify when an amount of errors associated with transmission over the wireless voice channel reaches a preset threshold. Another operation includes, if the monitoring indicates the error amount reaching the preset threshold, adapting processing of the received digital bit stream.

Another operation includes, if the monitoring indicates the error amount reaching the preset threshold, transitioning from encoding using a first symbol type to encoding using a second symbol type having a greater duration than the first symbol type.

Another operation includes, if the monitoring indicates the error amount reaching the preset threshold, transitioning from encoding using a first frequency set to encoding using a second lower frequency set.

Another operation includes, if the monitoring indicates the error amount reaching the preset threshold, encoding into the audio signal a first pattern, wherein the first pattern supplies more waveform information for the receiver to use in identifying a symbol than a second bit length encoded into the audio signal before the erroneous transmission is identified.

Another operation includes counting a number of non-acknowledgements or processing signaling generated by a receiving endpoint, wherein the adapting is based on said counting or said signaling It will be obvious to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the typical navigation device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A memory device encoded with instructions that, if executed, result in:
processing a received digital bitstream using a particular modulation parameter set to generate an audio signal that has different audio tones for different bit values, wherein the audio tones are selected to pass through a wireless voice channel of a wireless telecommunication network unobstructed by a vocoder, wherein the particular modulation parameter set is optimized for a subset of a plurality of vocoding modes without a priori knowledge of which one of the plurality of vocoding modes is currently operated by the vocoder for vocoding the audio signal;
transmitting the generated audio signal over the wireless voice channel of the wireless telecommunications network;
determining whether an amount of errors associated with the transmission over the wireless voice channel reaches a preset threshold according to error detecting performed by a receiver; and
switching from the particular modulation parameter set to a different modulation parameter set in response to determining that the amount of errors associated with the transmission over the wireless voice channel reached the preset threshold.

2. The memory device of claim 1, wherein the different modulation parameter set is designed for wider compatibility than the particular modulation parameter set, and wherein the different modulation parameter set is non-optimized with said subset of vocoding modes and/or optimized with a different subset of vocoding modes.

3. The memory device of claim 1, wherein the instructions, if executed, result in:
transitioning from encoding using a first symbol type to encoding using a second symbol type having a greater duration than the first symbol type in response to determining that the amount of errors associated with the transmission over the wireless voice channel reached the preset threshold.

4. The memory device of claim 1, wherein the instructions, if executed, result in:
transitioning from encoding using a first frequency pair to encoding using a second lower frequency pair in response to determining that the amount of errors associated with the transmission over the wireless voice channel reached the preset threshold.

5. The memory device of claim 1, wherein the instructions, if executed, result in:
encoding into the audio signal a first pattern in response to determining that the amount of errors associated with the transmission over the wireless voice channel reached the preset threshold, wherein the first pattern supplies more waveform information for the receiver to use in identifying a symbol than a second pattern encoded into the audio signal prior to determining that the amount of errors associated with the transmission over the wireless voice channel reached the preset threshold.

6. The memory device of claim 1, wherein the instructions, if executed, result in:
transitioning from encoding using a first symbol type to encoding using a second symbol type having a greater duration than the first symbol type in response to determining that the amount of errors associated with the transmission over the wireless voice channel reached the preset threshold, transitioning from encoding using a first frequency set to encoding using a second different frequency set in response to determining that the amount of errors associated with the transmission over the wireless voice channel reached the preset threshold, and encoding into the audio signal a first pattern, wherein the first pattern supplies more waveform information for the receiver to use in identifying a symbol than a second pattern encoded into the audio signal prior to determining that the amount of errors associated with transmission over the wireless voice channel reached the preset threshold.

7. The memory device of claim 1, wherein the instructions, if executed, result in:
switching from a full-duplex transmission mode to a half-duplex transmission mode in response to determining that the amount of errors associated with the transmission over the wireless voice channel reached the preset threshold.

8. The memory device of claim 1, wherein at least some of the errors result from the vocoder operating a vocoding mode that is not included in the subset to which the particular modulation parameter set is optimized.

9. The memory device of claim 1, wherein the instructions, if executed, result in:
counting a number of non-acknowledgements, wherein the switching is based on said counting.

10. The memory device of claim 1, wherein the instructions, if executed, result in:
processing signaling generated by a receiving endpoint, wherein the switching is based on said signaling.

11. A method, comprising:
processing a received digital bitstream using a particular modulation parameter set to generate an audio signal that has different audio tones for different bit values, wherein the audio tones are selected to pass through a wireless voice channel of a wireless telecommunication network unobstructed by a vocoder, wherein the particular modulation parameter set is optimized for a subset of a plurality of vocoding modes without a priori knowledge of which one of the plurality of vocoding modes is currently operated by the vocoder for vocoding the audio signal;

transmitting the generated audio signal over the wireless voice channel of the wireless telecommunications network;

feeding back actual error information from a demodulation endpoint for the transmission over the wireless voice channel;

wherein the fed back actual error information represents a result of error detecting performed by the demodulation endpoint; and switching from the particular modulation parameter set to a different modulation parameter set when the fed back error information indicates errors reaching a preset threshold.

12. The method of claim 11, wherein the different modulation parameter set is non-optimized with said subset of vocoding modes and/or optimized with a different subset of vocoding modes.

13. The method of claim 11, further comprising:

transitioning from encoding using a first symbol type to encoding using a second symbol type having a greater duration than the first symbol type when the fed back error information indicates errors reaching the preset threshold.

14. The method of claim 11, further comprising:

transitioning from encoding using a first frequency set to encoding using a second lower frequency set when the fed back error information indicates errors reaching a preset threshold.

15. The method of claim 11, further comprising:

encoding into the audio signal a first pattern, wherein the first pattern supplies more waveform information for the receiver to use in identifying a symbol than a second pattern encoded into the audio signal before the preset threshold is reached.

16. A memory device encoded with instructions that, if executed, result in:

determining whether a vocoder is currently operating a particular one or ones of a plurality of vocoding modes;

processing a received digital bitstream using a particular modulation parameter set to generate an audio signal that has different audio tones for different bit values, wherein the audio tones are selected to pass through a wireless voice channel of a wireless telecommunication network unobstructed by the vocoder;

wherein if the determination indicates that the vocoder is currently operating the particular one or ones of the plurality of vocoding modes, the particular modulation parameter set has a first set of parameters, and wherein otherwise the particular modulation parameter set has a second different set of parameters;

transmitting the generated audio signal over the wireless voice channel of the wireless telecommunications network;

determining whether an amount of errors associated with the transmission over the wireless voice channel reaches a preset threshold according to error detecting performed by a receiver; and adapting processing of the received digital bitstream in response to determining that the amount of errors associated with the transmission over the wireless voice channel reached the preset threshold.

17. The memory device of claim 16, wherein the instructions, if executed, result in:

transitioning from encoding using a first symbol type to encoding using a second symbol type having a greater duration than the first symbol type in response to determining that the amount of errors associated with the transmission over the wireless voice channel reached the preset threshold.

18. The memory device of claim 16, wherein the instructions, if executed, result in:

transitioning from encoding using a first frequency set to encoding using a second lower frequency set in response to determining that the amount of errors associated with the transmission over the wireless voice channel reached the preset threshold.

19. The memory device of claim 16, wherein the instructions, if executed, result in:

encoding into the audio signal a first pattern in response to determining that the amount of errors associated with transmission over the wireless voice channel reached the preset threshold, wherein the first pattern supplies more waveform information for the receiver to use in identifying a symbol than a second pattern encoded into the audio signal prior to determining that the amount of errors associated with transmission over the wireless voice channel reached the preset threshold.

20. The memory device of claim 16, wherein the instructions, if executed, result in:

counting a number of non-acknowledgements or processing signaling generated by a receiving endpoint, wherein the adapting is based on said counting or said signaling.

* * * * *